(12) United States Patent
Rowe et al.

(10) Patent No.: US 12,028,204 B2
(45) Date of Patent: Jul. 2, 2024

(54) NETWORK EVENT DETECTION AND AUTOMATED REMEDIATION

(71) Applicant: Ivanti, Inc., South Jordan, UT (US)

(72) Inventors: Robin Rowe, Daresbury (GB); Jack Smith, Daresbury (GB)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 18/046,136

(22) Filed: Oct. 12, 2022

(65) Prior Publication Data

US 2023/0116748 A1 Apr. 13, 2023

Related U.S. Application Data

(60) Provisional application No. 63/255,360, filed on Oct. 13, 2021, provisional application No. 63/281,675, filed on Nov. 21, 2021.

(51) Int. Cl.
*H04L 12/00* (2006.01)
*H04L 41/0654* (2022.01)
*H04L 41/0681* (2022.01)

(52) U.S. Cl.
CPC ...... *H04L 41/0654* (2013.01); *H04L 41/0681* (2013.01)

(58) Field of Classification Search
CPC ............. H04L 41/0654; H04L 41/0681; H04L 41/0886; H04L 41/5074; H04L 41/0663; H04L 41/046
USPC .................................................. 709/223–224
See application file for complete search history.

(56) References Cited

U.S. PATENT DOCUMENTS

| | | | | |
|---|---|---|---|---|
| 7,832,008 | B1* | 11/2010 | Kraemer | H04L 63/20 709/224 |
| 8,707,427 | B2* | 4/2014 | Hooks | G06F 21/567 726/22 |
| 9,438,614 | B2* | 9/2016 | Herz | H04L 41/16 |
| 10,230,761 | B1* | 3/2019 | Joffe | H04L 63/1441 |
| 10,970,396 | B2* | 4/2021 | Gezalov | G06F 21/568 |
| 11,134,020 | B1* | 9/2021 | Park | H04L 47/27 |

(Continued)

OTHER PUBLICATIONS

International Search Report and Written Opinion for Patent Application No. PCT/US2022/078056, dated Jan. 26, 2023, 13 pages.

(Continued)

*Primary Examiner* — Frantz Coby (57) ABSTRACT

A method of identification and remediation of a mass event in a managed network. The method includes receiving a first report of an event occurring at a first endpoint of the managed network. In response, a first action is performed. The first action being initiated based on a repeating event trigger not being triggered. The method includes receiving a second report of the event occurring at a second endpoint. In response, the method includes determining whether a threshold that triggers the repeating event trigger is exceeded. The threshold being indicative of a mass event in the managed network. Responsive to the threshold being exceeded, the method includes triggering the repeating event trigger and performing a second automated resolution action in the managed network. The second action being different from the first action. Responsive to the threshold not being exceeded, the method includes performing the first action at the second endpoint.

20 Claims, 5 Drawing Sheets

(56) References Cited

U.S. PATENT DOCUMENTS

| | | | |
|---|---|---|---|
| 2002/0184568 A1* | 12/2002 | Kurrasch | G06F 11/0793 714/39 |
| 2019/0230100 A1* | 7/2019 | Dwyer | H04L 41/046 |
| 2020/0267167 A1* | 8/2020 | Venkataswami | H04L 41/0213 |
| 2021/0282230 A1* | 9/2021 | Nelson | H04W 76/12 |
| 2022/0225101 A1* | 7/2022 | Fellows | H04W 12/122 |

OTHER PUBLICATIONS

International Preliminary Report on Patentability and Written Opinion of the International Searching Authority for Application No. PCT/US2022/078056, dated Apr. 25, 2024, 9 pages.

* cited by examiner

NETWORK EVENT DETECTION AND AUTOMATED REMEDIATION

CROSS-REFERENCE TO RELATED APPLICATIONS

This application is claims benefit of and priority to U.S. Provisional Application Nos: 63/255,360, filed Oct. 13, 2021, and 63/281,675, filed Nov. 21, 2021. The disclosures of these applications are incorporated herein by reference in their entireties.

FIELD

The embodiments discussed herein are related to network endpoint device management and in particular to network event detection and automated remediation.

BACKGROUND

The use of the electronic devices has become increasingly prevalent in modern society. Many electronic devices are configured to access and communicate via networks. Management of the electronic devices in the networks may be facilitated by network management service software such as service management systems and endpoint management systems. Service management systems, endpoint management systems, and other network management systems may enable administration and control of the electronic devices. For instance, a ticketing system may be implemented, which may enable users of the electronic devices to communicate technical issues to an administrator or information technology (IT) personnel. Additionally or alternatively, an endpoint management system may implement a patch management or application management service, which may ensure updated software applications are running on the electronic devices and only particular applications are running on the electronic devices, respectively.

As numbers of electronic devices increase in networks, the network management becomes more difficult. Accordingly, higher amounts of resources are dedicated to network management. To reduce these resources, some network management systems have implemented automated processes. For instance, responsive to a particular ticket (e.g., a ticket indicating a problem printing), the network management system might automatically resolve or communicate instructions to resolve the issue causing the particular ticket (e.g., communicate instructions to find a network printer). However, automation in some conventional systems is reactive to specific triggers. Accordingly, the automatic or automated resolutions may be limited to individualized implementation on a case-by-case basis. Thus, pervasive problems (e.g., those affecting multiple electronic devices) might be slowly resolved as each device experiences the problem. Accordingly, a need exists to improve automated resolution actions in managed networks and identify as well as address network-wide or pervasive issues in the managed network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of the invention, an embodiment includes a method of identification and automated remediation of a mass event in a managed network. The method may include receiving, at an endpoint management system, a first report of an event occurring at a first endpoint of endpoints that are included in a managed network. In response to receiving the first report, the method may include performing a first automated resolution action at the first endpoint. The first automated resolution action may be initiated based at least in part on a repeating event trigger not being triggered.

The method may include receiving, at the endpoint management system, a second report of the event occurring at a second endpoint of the endpoints. In response to receiving the second report, the method may include determining whether a threshold that triggers the repeating event trigger has been exceeded. The threshold may be indicative of a mass event occurrence in the managed network. Responsive to the threshold being exceeded, the method may include triggering the repeating event trigger and performing a second automated resolution action in the managed network. The second automated resolution action may be different from the first action. Responsive to the threshold not being exceeded, the method may include performing the first automated resolution action at the second endpoint.

A further aspect of an embodiment may include non-transitory computer-readable medium having encoded therein programming code executable by one or more processors to perform or control performance of one or more of the operations of the methods identification and automated remediation of a mass event in a managed network described above.

An additional aspect of an embodiment may include compute device comprising one or more processors and a non-transitory computer-readable medium having encoded therein programming code executable by one or more processors to perform or control performance of one or more of the operations of the methods of identification and automated remediation of a mass event in a managed network described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Electronic devices that access or otherwise interface with a network may be described as endpoint devices relative to the network. An endpoint management system may be employed to manage the endpoint devices of a particular network, which may be described as a managed network. The endpoint management system may monitor the endpoint devices, may ensure the endpoint devices comply with security requirements, may act to repair problems experienced by the endpoint devices, and the like. Thus, for example, the endpoint management system may promote efficiency, security, and functionality of the managed network at least in part through the management of the associated endpoint devices.

For instance, endpoint devices may provide malicious actors with an opportunity to access the managed network for nefarious reasons. The stakes associated with network security are high. For instance, malicious actors may attempt to obtain access to networks and connected systems in order to install ransomware, which may lock out owners and users from the network or connected systems until a ransom is paid. Alternately or additionally, malicious actors may leverage network access to steal confidential information, to wreak havoc on connected systems, to gain access to additional devices, and the like.

One way to mitigate the risk of malicious actors obtaining access to a network is to require endpoint devices that access the network or intend to access the network to comply with security requirements. Thus, a network owner or a network manager may impose restrictions for endpoint devices that intend to access the network. By way of example, the network owner may require that endpoint devices function as intended, keep programs installed on the endpoint device updated through patches, have an enabled firewall, have an up-to-date antivirus application, and the like. Encouraging the endpoint devices to work as intended by repairing problems may further promote security of the managed network.

To maintain the network in a condition in which the security requirements and other system parameters are met, the network manager may implement one or more embodiments describe in the present disclosure.

In addition, managed networks and in particular managed networks with automated resolution actions, may fail to detect when a seemingly isolate issue is widespread. For instance, a ticket sent from an individual endpoint may trigger a first resolution action, which may be automated (e.g., automatic responsive to the ticket). Because the issue causing the ticket is automatically resolved, it may be obscured from a network administrator. However, the issue may concurrently or subsequently affect other endpoint devices. As the issue occurs at additional endpoint devices, the network management system may be inundated with large numbers of tickets, which may consume computing resources.

Accordingly, some embodiments described in the present disclosure may be implemented to identify widespread or re-occurring issues. Additionally, after the widespread or reoccurring issue is identified, the system may implement a resolution action that is at least partially different from an action that is implemented when the issue is not widespread or recurring. For instance, some embodiments may include facilitating network security and other network compliance. These and other embodiments may include receiving reports or tickets of an event occurring to at least one endpoint device of multiple endpoint devices of a managed network. A first action may be performed in response to a first report indicating the event occurred. A second action may be performed in response to receiving a second report of the event occurring. The second action may be different from the first action. Performance of the first action and the second action may be based at least in part on a number of reports or instances of the event. For instance, these and other embodiments may implement a repeating event trigger. The repeating event trigger may be configured such that the first action is performed when a number of the reports of the is below a threshold and the second action is performed with the number of the reports of the event is above the threshold. For instance, the first action may resolve an individualized instance of the event and the second action may resolve a network-wide instance of the event. Accordingly, these and other embodiments may resolve events on an individualized basis, identify when the event is widespread, and when the event is widespread, implement a second action to resolve or mitigate the event on a network-basis.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
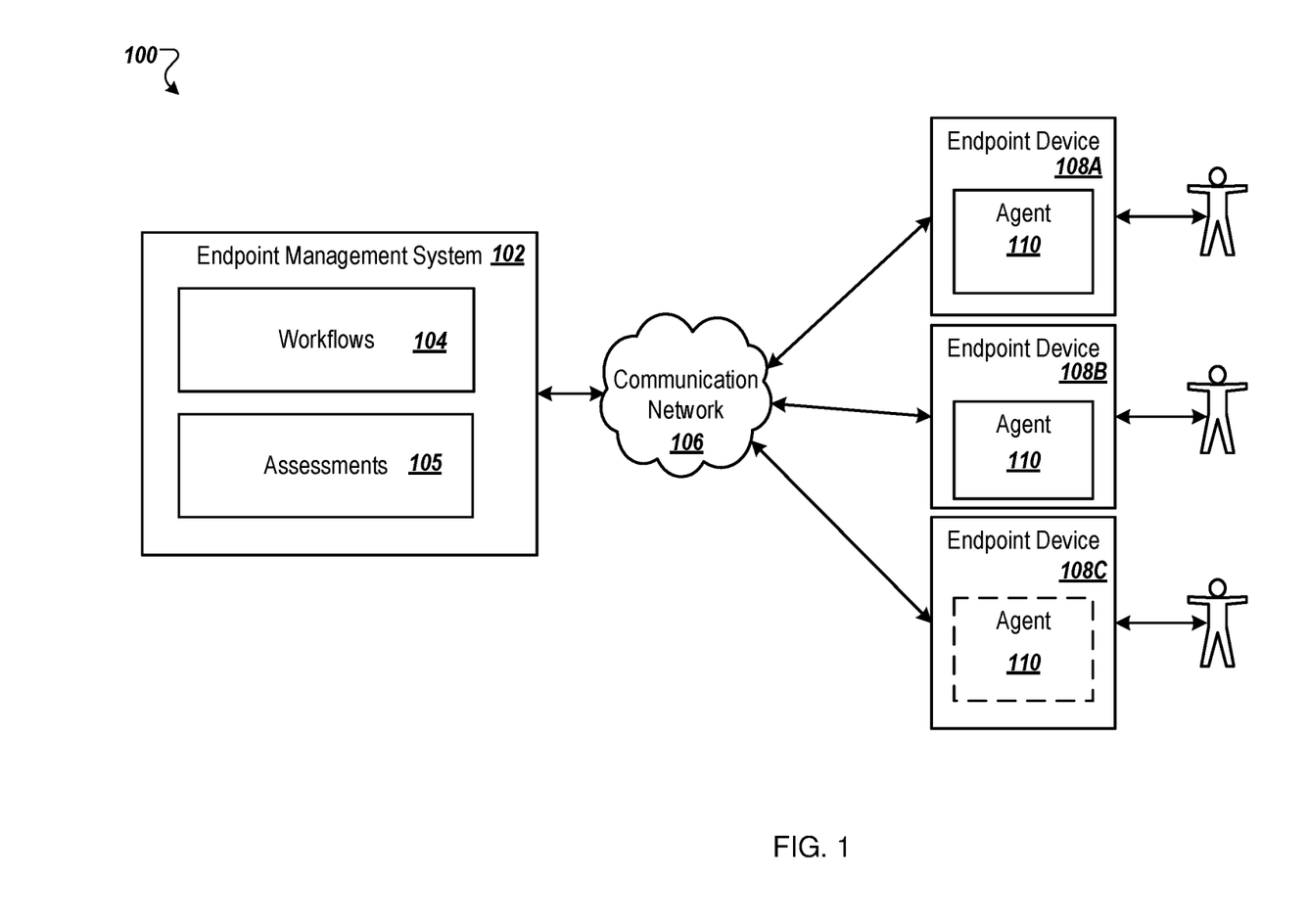
FIG. 1 illustrates an example network management system m which some embodiments may be implemented.

FIG. 1 illustrates an example network management system 100 in which some embodiments of the present invention may be implemented. The network management system 100 may include an endpoint management system 102 that may communicate with endpoint device 108a, endpoint device 108b, and endpoint device 108c (collectively, endpoint devices 108) via a communication network 106. Although three compliant endpoint devices 108 are illustrated, more than three compliant endpoint devices 108 may be present in a practical network management system 100. The endpoint devices 108 may be associated with a network managed by the network management system 100. For example, the managed network may include a network owned by a business and the endpoint devices 108 may include business-owned computers for employees to perform employment-related duties; personal computing devices such as mobile phones, tablets, computers not controlled by the business that may be used by employees, customers, vendors, and the like to access the network managed by the network management system 100; connected devices such as servers, printers, network infrastructure, and the like; or other devices that may interface with the managed network.

The communication network 106 may include the network managed by the network management system 100. For example, the communication network 106 may include the managed network (e.g., an enterprise intranet) and a part of the internet. Alternately, the communication network 106 may be separate from the managed network. For example, the communication network 106 may include a part of the internet and the managed network may restrict access by one or more of the endpoint devices 108 until compliant with the conditions imposed by the endpoint management system 102. Alternately, the communication network 106 may represent the managed network.

The network management system 100 may take actions to keep the associated managed network functional and safe from the actions of malicious actors. Additionally, the network management system 100 may take actions to otherwise control aspects and parameters of the endpoint devices 108. One tool used by the network management system 100 may include the endpoint management system 102. The endpoint management system 102 may identify and catalog the endpoint devices 108 that interface with the managed network. The endpoint management system 102 may identify the endpoint devices 108 to which emails, documents, and other information are transferred via the managed network.

In some configurations, agents 110 may be installed on one or more of the endpoint devices 108. The agents 110 may provide the endpoint management system 102 with more information about the associated endpoint devices 108 relative to endpoint devices 108 that do not include the agents 110. The information collected about the endpoint devices 108, optionally via the agents 110, may be used to manage one of the endpoint device 108 as well as other endpoint devices 108. For example, if the endpoint management system 102 identifies or is notified of an issue with one of the endpoint devices 108 (e.g., endpoint device 108a) that is a risk to the managed network, the endpoint management system 102 may use knowledge regarding the endpoint devices 108 to identify those endpoint devices 108 (e.g., the other endpoint devices 108b and 108c) that may pose a similar risk. By way of example, if installed software or a particular setting of the endpoint device 108a results in an issue with the endpoint device 108a, a fix may be created and implemented for the issue, applied to the endpoint device 108a, and further applied to any of the endpoint devices 108 that include the same software or particular setting.

In addition, the fix may be implemented or partially implemented by the agent 110. For instance, the endpoint management system 102 may communicate a command or signal related to the fix to the agent 110 at the endpoint device 108. The agent 110 may receive the command and implement a change in a state or a functional operation of the endpoint device 108 based thereon.

In some embodiments, one or more of the endpoint devices 108 may not include the agent 110. In these and other embodiments, the endpoint management system 102 may be configured to communicate inquiries to the endpoint devices 108 not having installed thereon the agent 110. Through communication of the inquiries, information may be obtained or accessed regarding the endpoint devices 108. The information may include software and hardware configurations (e.g., particular programs and applications installed and particular settings active), whether software is sufficiently up to date, device type, etc.

The endpoint devices 108 may be implemented to generate and communicate notifications such as support tickets and reports to the endpoint management system 102. In some instances, the agents 110 at the endpoint devices 108 may at least partially generate or communicate the notifications to the endpoint management system 102. For example, responsive to a deficiency or technical issue a user of one of the endpoint devices 108 may generate a ticket to report the technical issue. In some embodiments, the support request tickets may be submitted by the agents 110, by users of the endpoint devices 108, by the endpoint devices 108 itself, or the like. By way of example, the endpoint devices 108 may submit a support request ticket upon determining that an email management program has ceased functioning properly or another similar IT technical issue.

Additionally or alternatively, the agent 110 of one of the endpoint devices 108 may determine that a setting (e.g., a security setting) has been disabled or a software application has been removed. Responsive to detection of disablement of the setting or removal of the software application, the agent 110 may communicate a notification to the endpoint management system 102.

The notifications and/or the accessed information may be entered into one or more workflows 104 implemented by the endpoint management system 102. In some embodiments, the endpoint management system 102 may be informed of issues with the endpoint devices 108 through notifications (e.g., support tickets) or accessed information. The endpoint management system 102 may perform endpoint device management tasks using the workflows 104. The workflows 104 may define one or more series of steps the endpoint management system 102 may take to manage the endpoint devices 108. The workflows 104 may be conditional and may proceed with different steps in response to different scenarios.

In some embodiments, the endpoint management system 102 may be configured to facilitate network security and resolve technological issues at least partially based on reports or notifications of events occurring on the endpoint devices 108. In the embodiment of FIG. 1, the endpoint management system 102 may be configured to perform the workflows 104 based on numbers of reports or notifications during particular periods of time.

For instance, the endpoint management system 102 may receive reports of an event occurring to at least one endpoint devices 108. Responsive to a first report of the event occurring, the endpoint management system 102 may perform a first action. The first action may be based at least in part on a repeating event trigger and in particular to the repeating event trigger not being triggered by the first report or multiple reports received prior to performance of the first action. The repeating event trigger may then be triggered based at least in part on receiving a threshold number of reports of the event occurring among the endpoint devices 108. Responsive to receipt of a second report of the event occurring, the endpoint management system 102 may perform a second action. The second action may be based at least in part on the repeating event trigger being triggered. The second action is different from the first action. The first and second actions may be automated or at least partially automated. For instance, an example of the first action may include an automated command communicated from the endpoint management system 102 to the endpoint device 108 for implementation to resolve an issue on the endpoint device 108.

In some embodiments, the endpoint management system 102 may implement one or more additional actions based on one or more reports or threshold numbers of reports. For instance, in response to receiving the second report of the event occurring, the endpoint management system 102 may be configured to perform a third action based at least in part on the repeating event trigger being triggered. In these and other embodiments, the third action may be configured to be performed no more than one time following the triggering of the repeating event trigger.

The repeating event trigger may indicate that the event or events is a mass event. For example, receiving reports from a threshold number of endpoint devices 108 may indicate that the subject matter of the report is or going to be experienced by multiple other endpoint devices 108. The term mass event is a widespread or pervasive event occurring on multiple endpoint devices 108. For instance, the mass event may be indicative of an IT technical issue that effects some or eventually all of the endpoint devices 108. Examples of mass events might include a patch that is not installing correctly, a security vulnerability that is being exploited, an inability to integrate programs, an inoperable program, a device or network appliance failure, inaccessibility of a database, another IT technical issue that might affect multiple endpoint devices 108 or networks, combinations thereof, or other mass events.

Some embodiments described herein may be configured to detect when the mass event is occurring (or has occurred), and initiate actions specifically configured to address the mass event as opposed to a single instance of the event. For instance, a single report of a malfunctioning of an email account might initiate an automated action to reload the email application. Multiple reports (e.g., above the threshold such as 15%, 20%, 25% of the endpoint devices 108) of a malfunction of the email accounts may indicate a mass event. Responsive to the mass event, an additional automated action may be performed. The additional automated action might include evaluating a network connection that supports email communications or notifying an IT specialist who is responsible for the email system.

Thus, the repeating event trigger may be configured in multiple ways to detect the mass event. For instance, the repeating event trigger may set a threshold related to a number of reports of the event occurring multiple times by a single endpoint device 108, a number of reports during a threshold length of time (e.g., one working shift, three hours, or another suitable time period), a threshold number (e.g., 100, 1000, etc.) or portion (e.g., $\frac{1}{10}$, $\frac{1}{20}$, $\frac{1}{30}$, etc.) of the endpoint devices 108 of all the endpoint devices 108, and the like.

The actions performed by the endpoint management system 102 may include automated actions that resolve the issue, instructions for manual resolutions, or combinations thereof. For instance, the actions might include isolating one or more of the endpoint devices 108, communicating commands to reload or otherwise modify a state at the endpoint devices 108, and sending notifications to the endpoint devices 108 or devices associated therewith.

The repeating event trigger may include a period-reset length of time. For instance, in an example workflow 104, a repeating event trigger might be triggered by ten reports. Additionally, prior to the repeating event trigger being triggered a first action may be performed. In this example workflow 104, following the repeating event trigger being triggered, the first action and a second action may be performed. The period-reset length of time of the workflow 104 may be two hours. Thus, the repeating event trigger might be triggered by a tenth report of an issue from the endpoint devices 108. After the repeating event trigger is triggered, the first and second actions may be performed for each subsequent report or notification for two hours. After the two hours, only the first action may be performed.

In some embodiments, the endpoint management system 102 may implement one or more of the functionalities described above using a module. The module, the agent 110, and components thereof may be implemented using hardware including a processor, a microprocessor (e.g., to perform or control performance of one or more operations), a field-programmable gate array (FPGA), or an application-specific integrated circuit (ASIC). In some other instances, the module, the agent 110, and components thereof may be implemented using a combination of hardware and software. Implementation in software may include rapid activation and deactivation of one or more transistors or transistor elements such as may be included in hardware of a computing system (e.g., the endpoint devices 108 or the endpoint management system 102 of FIG. 1). Additionally, software defined instructions may operate on information within transistor elements. Implementation of software instructions may at least temporarily reconfigure electronic pathways and transform computing hardware.

Modifications, additions, or omissions may be made to the network management system 100 without departing from the scope of the present disclosure. For example, the network management system 100 may include one or more communication networks 106, one or more endpoint management systems 102, one or more endpoint devices 108, or any combination thereof. Additionally, the network management system 100 may include multiple networks of the endpoint devices 108. For instance, the network management system 100 might include a first network of endpoint devices 108 that are related to a first enterprise or entity and a second network of endpoint devices 108 that are related to a second enterprise or entity. The endpoint management system 102 may receive reports or notifications from the first network and perform actions in the second network.

Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
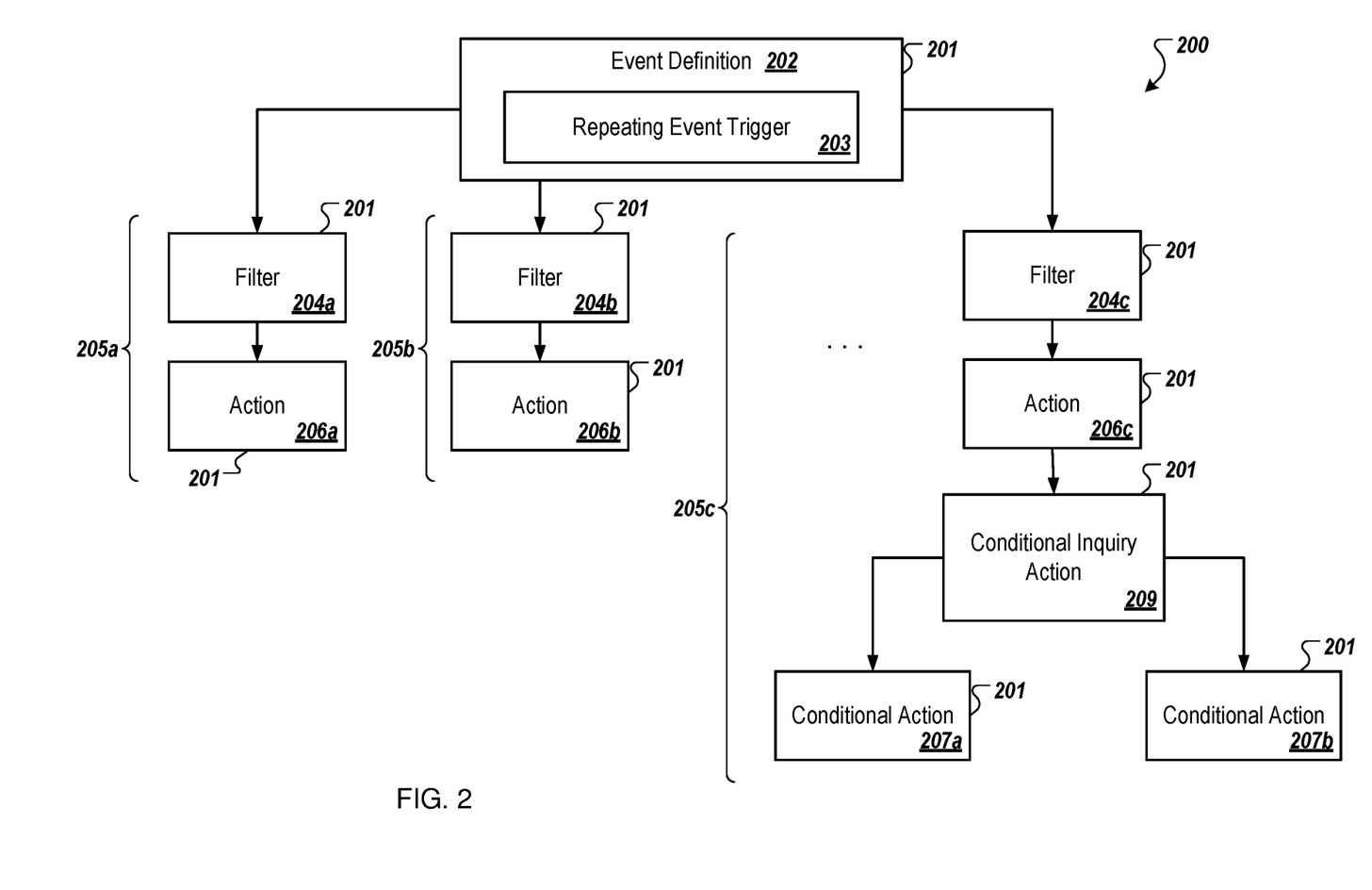
FIG. 2 illustrates an example workflow that may be implemented in the network management system of FIG. 1.

FIG. 2 illustrates an example workflow 200 that may be implemented in a network management system such as the network management system 100 of FIG. 1. For instance, in some implementations, the workflow 200 may generally correspond to one of the workflows 104 of FIG. 1. The workflow 200 may represent a set of actions (in FIG. 2, 206a-206c) or instructions to perform the set of action that are implemented by one or more computing devices. For instance, with reference FIGS. 1 and 2, the workflow 200 may be implemented in the network management system 100. In this example, the actions 206 might include a first action 206a which may be performed by the first endpoint device 108a; a second action 206b, which may be performed by the second endpoint device 108b; and a third action 206c, which may be performed by the endpoint management system 102.

The workflow 200 includes multiple workflow elements 201. The workflow elements 201 include graphical representations of instructions, actions filters, and definitions. The workflow elements 201 may be displayed on a computing device and assembled into the workflow 200 using a low-code or no-code user interface.

In some embodiments, the workflow 200 may be generated by dragging and dropping workflow elements 201 via a graphic user interface (GUI) associated with an endpoint management system, such as the workflows 104 of FIG. 1. The drag-and-drop system may facilitate workflow creation by users without familiarity of computer programing languages. The workflow 200 of FIG. 2 includes ten workflow elements 201. Other workflows might include fewer than ten or more than ten workflow elements 201.

The workflow 200 may be generated to determine whether a mass event is occurring, a severity of the mass event, and one or more actions 206 that are automatically triggered based on these determinations.

For instance, the workflow 200 may include an event definition 202. The event definition 202 may define an occurrence experienced by an endpoint device, such as the endpoint devices 108 of FIG. 1. The occurrence experienced by one or more endpoint devices in a managed network and reported to an endpoint management system. For instance, the occurrence may be experienced by one or more of the endpoint devices 108 of FIG. 1, which may be reported the agents 110 as described above.

The event definition 202 may include any occurrence experienced by the one or more endpoint devices. The occurrence may relate to endpoint device security, endpoint device functionality, network security, or the like. For example, the event definition 202 may include an application installed on an endpoint device failing to function as desired, such as an email program ceasing to function properly. Alternately or additionally, the event definition 202 may include a change of a setting on the endpoint device, such as the firewall of the endpoint device being disabled.

The workflow 200 may include a repeating event trigger 203. The repeating event trigger 203 may be based on an event occurring and/or being reported multiple times. The event may occur at multiple endpoint devices and/or may occur multiple times to a particular endpoint device. Whether the workflow 200 follows action path 205a, action path 205b, and/or action path 205c (generally, action path 205 or action paths 205) may depend, in part, on whether the repeating event trigger 203 has been satisfied, described in the present disclosure as triggered.

By way of example, the repeating event trigger 203 may be based, in part, on a threshold number of associated events occurring or being reported. Optionally, the threshold number of associated events may be required to occur within a threshold period of time.

In some configurations, once the repeating event trigger 203 is triggered, the repeating event trigger 203 may remain triggered for a period-reset length of time. Following the period-reset length of time, the repeating event trigger 203 may be reset. When the repeating event trigger 203 has been reset, the associated event counter may be restarted. Where a threshold time is employed, the associated time period may also be restarted.

In some embodiments, which of the action paths 205 are followed may depend on whether the repeating event trigger 203 has been triggered. Alternately or additionally, other criteria may be considered in determining which of the action paths 205 are followed. A filter 204a may be defined to detail the criteria for performing the action path 205a, including action 206a. Likewise, filter 204b and filter 204c may detail the criteria for performing the action path 205b and action path 205c, respectively, including action 206b and action 206c, respectively. By way of example, filter 204a may be defined such that action path 205a is performed while the repeating event trigger 203 is not triggered, filter 204b may be defined such that action path 205b is performed while the repeating event trigger 203 is trigged and filter 204c may defined such that action path 205c is performed one time each time the repeating event trigger 203 is triggered.

Although each of the action paths 205 illustrate a single action 206, multiple actions 206 may be associated with the action paths 205. In some embodiments, the actions 206 may include messaging a user of an endpoint device to gather information to use in the action paths 205, as described elsewhere in the present disclosure.

In the depicted workflow 200, the third action path 205c may include a conditional inquiry action 209. The conditional inquiry action 209 may be used in the action path 205c to dictate whether the action path 205c proceeds to a first conditional action 207a or a second conditional action 207b.

In some embodiments, when implementing the conditional inquiry action 209, the endpoint management system (e.g., 102 of FIG. 1) may send messages to users of the endpoint devices (e.g., 108 of FIG. 1). For instance, the endpoint management system may communicate an inquiry message to the user. Responses to the messages may facilitate relatively more complex, more targeted, and/or more relevant workflow 200 steps than may be available without user feedback. For example, an inquiry message may be sent to a user of an endpoint device that requests information about the endpoint device, about user preference, or the like. Based on the response, the action path 205c may proceed to the first conditional action 207a (e.g., responsive to a first response) or to a second conditional action 207b (e.g., responsive to a second response).

In some configurations, the messages may be sent to the user via a communication application installed on the endpoint device. For example, the messages may be sent to the user via an instant messaging application, email, short message service (SMS) messages, a pop-up window presented by an agent of the endpoint management system installed on the endpoint device, or the like.

By way of example, the workflow 200 may be configured to respond to email programs failing to function properly. For example, the workflow 200 may assist users with endpoint devices that are experiencing issues with email programs. Where users are having an individual issue, the workflow 200 may work through common fixes that may be implemented by the user or through an agent installed on the endpoint device. Potentially, an information technology (IT) professional may be prompted to provide additional assistance as needed. However, if a significant number of endpoint devices of the managed network experience email program issues within a relatively short period of time, it may indicate that an issue common to multiple endpoint devices may be prompting the email program issues. For instance, an operating system update, a program update, or the like may cause an issue. Such a scenario may be likely to benefit from IT attention and/or development of a specialized fix for the endpoint devices of the managed network that share the common issue.

Thus, for example, the event definition 202 may include an email program installed on an endpoint device ceasing to function properly. The event definition 202 may be triggered when a ticket associated with an endpoint device reports an email program issue or the like. The repeating event trigger 203 may be configured to trigger in response to receiving ten associated tickets within thirty minutes. The period-reset duration may be two hours.

The filter 204a may be defined such that action path 205a is followed when the repeating event trigger 203 is not triggered. The filter 204b may be defined such that action path 205b is followed a single time when the repeating event trigger 203 is triggered. The filter 204c may be defined such that action path 205c is followed indefinitely while the repeating event trigger 203 is triggered.

Thus, for example, as tickets indicating an email program problem are received from endpoint devices, the workflow 200 may follow action path 205a and may not follow action path 205b or action path 205c until ten such tickets are received within thirty minutes. The action path 205a may include the action 206a, which may include steps for repairing the email program problem being experienced by the associated endpoint device. For example, the action 206a may include sending an associated user of the endpoint device a message via an instant messaging application. For instance, the messages to the user of the endpoint device may walk the user through a series of troubleshooting steeps that may help identify the issue with the email program and/or correct the issue. In some configurations, the troubleshooting steps may generally correspond to steps that an IT professional might take to identify and correct the issue being experienced. Alternately or additionally, the action 206*a* may include deploying and installing a patch for the email program, updating the endpoint device to address an issue causing the email program problem, removing a virus from the endpoint device, prompting an IT professional to take control of the endpoint device remotely, requesting information from an agent installed on the endpoint device, rolling back the email program to an earlier-used configuration that did not experience functionality issues, and the like.

In response to the ten associated tickets being received within thirty minutes, the repeating event trigger 203 may be triggered. The repeating event trigger 203 being triggered may indicate that a mass event is occurring relative to an associated managed network. Thus, for example, the criteria for the repeating event trigger 203 may be selected to reflect the configuration of the managed network. A relatively larger managed network may define a repeating event trigger 203 that reflects the presence of more endpoint devices, which may generate a baseline rate of error tickets that might trigger a repeating event trigger 203 associated with a relatively smaller managed network.

Upon triggering the repeating event trigger 203, the workflow 200 may not follow the action path 205*a*, may follow the action path 205*b* one time and may follow the action path 205*c* for the period-reset duration of two hours.

The action path 205*b* may include the action 206*b*, which may include steps for responding to the triggered mass event. For example, the action 206*b* may include sending a message identifying the mass event to a critical incident response team of an IT department associated with the managed network.

The action path 205*c* may include the action 206*c*, which may include steps for the endpoint devices to respond to the mass event. For example, the action 206*c* may include sending a message to users of the effected endpoint devices that indicates that an IT department is devising a fix for the error that triggered the repeating event trigger 203. The action 206*c* may further include executing a script that addresses the issue that triggered the repeating event trigger 203 on the endpoint devices that may be vulnerable to the issue. In some configurations, the fix applied by the actions action 206*c* may be applied to endpoint devices that submitted a ticket and to vulnerable endpoint devices that did not submit a ticket. Thus, for example, the repeating event trigger 203 may trigger endpoint device repair throughout the managed network.

In some configurations, the action paths 205 may include an action path that is followed regardless of whether the repeating event trigger 203 has been triggered. By way of further example, the workflow 200 may be configured to respond to a firewall being disabled on endpoint devices. If the firewall is disabled, a reminder to the user that indicates that the firewall should remain enabled may be sufficient to encourage compliance. However, if the firewall is disabled repeatedly despite such reminders, additional actions may need to be taken to prompt compliance.

Thus, for example, the event definition 202 may include a firewall being disabled on an endpoint device. The event definition 202 may be triggered when an agent installed on the endpoint device reports disablement of the firewall or the like.

The repeating event trigger 203 may be configured to trigger in response to the firewall for a particular endpoint device being disabled three times. Optionally, the repeating event trigger 203 may be associated with a threshold length of time, such as a year or the like. In some configurations, the repeating event trigger 203 may include no period-reset duration.

The filter 204*a* may be defined such that action path 205*a* is followed when the repeating event trigger 203 is not triggered. The filter 204*b* may be defined such that action path 205*b* is followed a single time when the repeating event trigger 203 is triggered. The filter 204*c* may be defined such that action path 205*c* is followed indefinitely while the repeating event trigger 203 is triggered.

Thus, for example, after the firewall is disabled, up to two times, the workflow 200 may follow action path 205*a* and may not follow action path 205*b* or action path 205*c*. The action path 205*a* may include the action 206*a*, which may include steps for reenabling the firewall and sending the user of the endpoint device a message that informs the user that the firewall has been reenabled and that the endpoint device will be isolated from the network if the firewall is disabled further.

In response to the firewall being disabled a third time, the repeating event trigger 203 may be triggered. The repeating event trigger 203 being triggered may indicate that a repeated event is occurring relative to an associated endpoint device. Upon triggering the repeating event trigger 203, the workflow 200 may not follow the action path 205*a*, may follow the action path 205*b* one time and may follow the action path 205*c* until the repeating event trigger 203 is reset.

The action path 205*b* may include the action 206*b*, which may include steps for responding to the triggered repeated event. For example, the action 206*b* may include isolating the associated endpoint device from the managed network, sending a message identifying the repeated event and the endpoint device to the IT department associated with the managed network.

The action path 205*c* may include the action 206*c*, which may include steps for reenabling the firewall and sending the user of the endpoint device a message that informs the user that the firewall has been reenabled, the endpoint device is isolated from the managed network, and that a member of the IT department will be contacting the user.

In some configurations, the action paths 205 may include an action path that is followed regardless of whether the repeating event trigger 203 has been triggered. For example, the workflow 200 may include an action path that reenables the firewall rather than including such a step in the action path 205*a* and the action path 205*c*.

Figure 3:
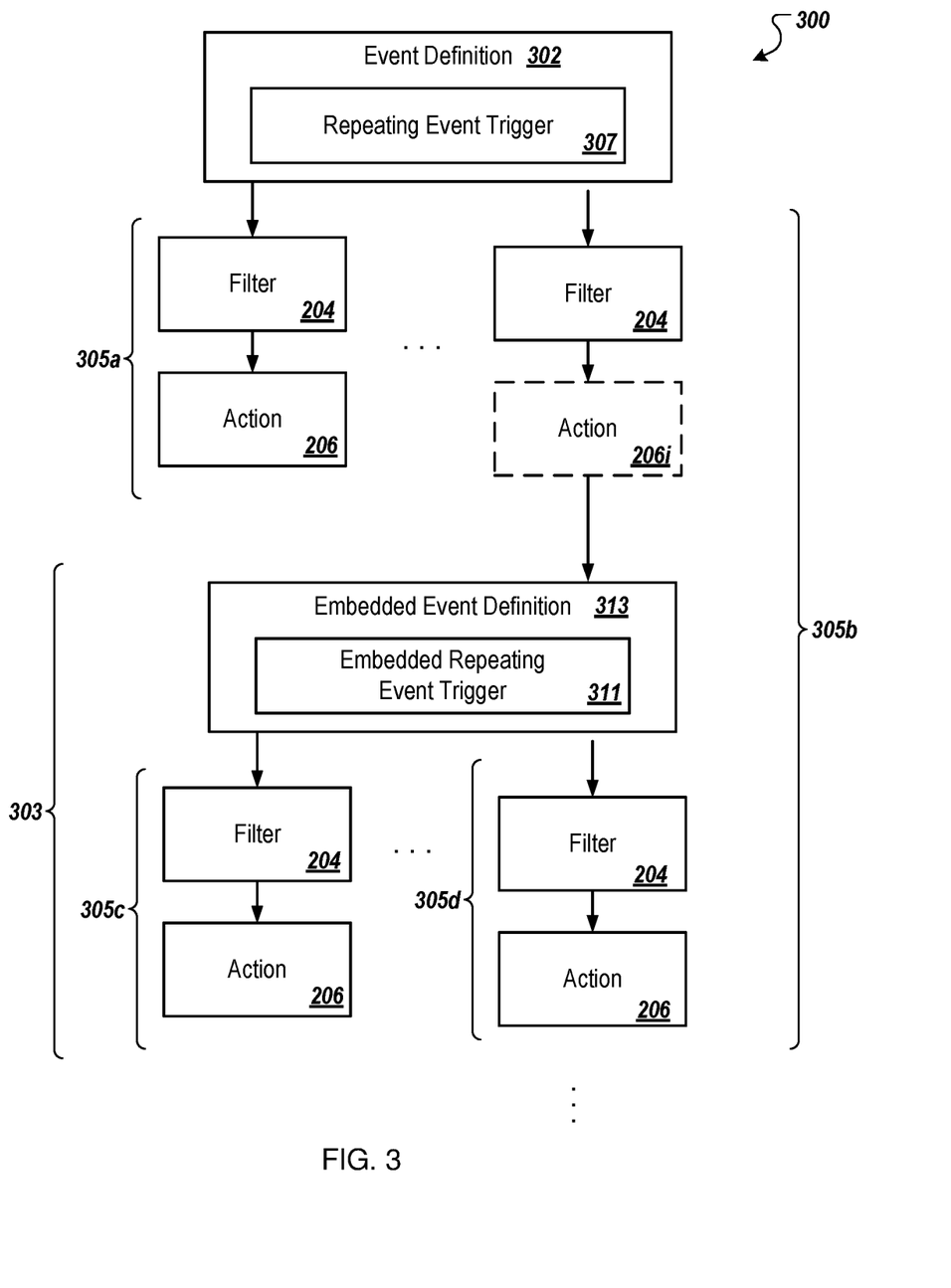
FIG. 3 illustrates another workflow that may be implemented in the network management system of FIG. 1.

In some embodiments, a workflow such as the workflow 200 might include an embedded workflow having an embedded event definition (e.g., 202) and one or more embedded action paths (e.g., 205). For example, FIG. 3 depicts a second example workflow 300 having an embedded workflow 303. The second workflow 300 may correspond to one of the workflows 104 of FIG. 1.

The second workflow 300 is similar to the workflow 200 described with reference to FIG. 2. For instance, the workflow 300 includes an event definition 302 that corresponds to the event definition 202, a repeating event trigger 307 that corresponds to the repeating event trigger 203, and action paths 305*a*-305*d* that include filters 204 and actions 206. A first action path 305*a* is similar to the action paths 205*a*-205*c* of FIG. 2.

In the workflow 300, a second action path 305*b* includes an embedded workflow 303. The embedded workflow 303 includes elements and features (e.g., filters 204, event definition 202, actions 206, etc.) similar to those of the workflow 200. The embedded workflow 303 is included as one of the actions (e.g., 206) in the second action path 305*b*.

For instance, the embedded workflow 303 includes an embedded event definition 313 having an embedded repeating event trigger 311. The embedded repeating event trigger 311 may triggered by the action 206*i* directly upstream of the embedded event definition 313. Thus, each time the action 206*i* occurs, a signal may be communicated to the embedded repeating event trigger 311. The signal received at the embedded repeating event trigger 311 may count against a threshold and/or a reset duration. Responsive to the threshold being exceeded, the workflow 300 may proceed down the action paths 305*c* or 305*d*.

In some embodiments, the embedded workflow 303 may be triggered through a conditional inquiry action such as the conditional inquiry action 209. In these and other embodiments, input may be requested from a user using a conditional inquiry action. Depending on the response, an action path such as the second action path 305*b* may proceed to the embedded workflow 303.

Figure 4:
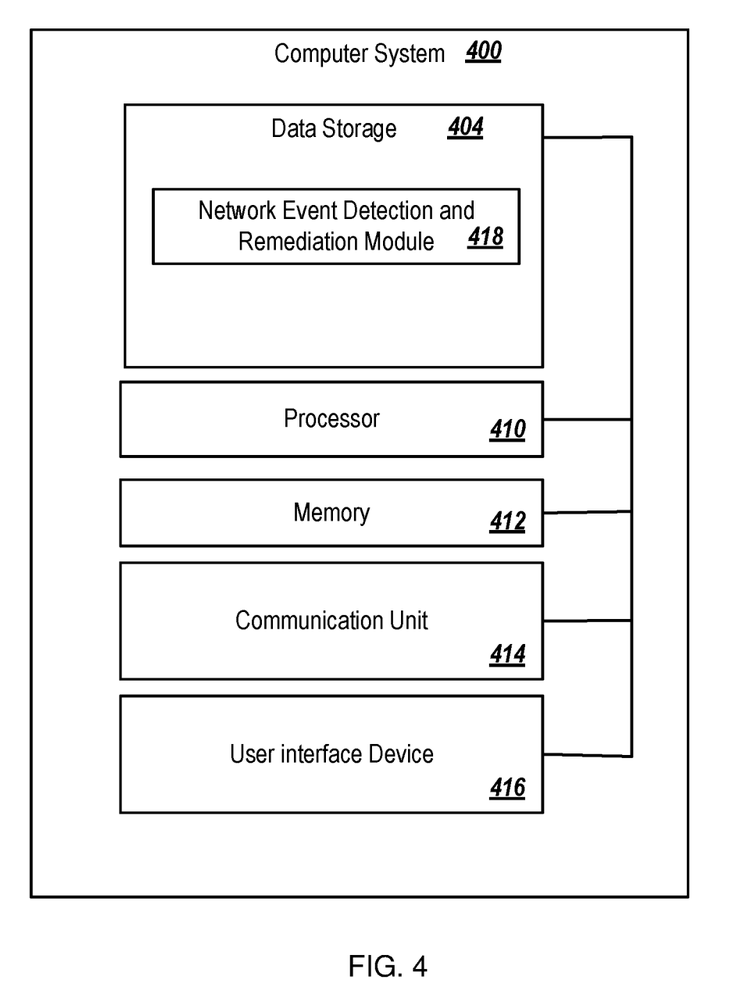
FIG. 4 illustrates an example computer system configured for network event detection and automated remediation.

FIG. 4 illustrates an example computer system 400 configured for network event detection and automated remediation, according to at least one embodiment of the present disclosure. The computer system 400 may be implemented in the network management system 100 FIG. 1, for instance. Examples of the computer system 400 may include one or both of the endpoint management system 102 and one or more of the endpoint devices 108. The computer system 400 may include one or more processors 410, a memory 412, a communication unit 414, a user interface device 416, and a data storage 404 that includes a module 418 configured for network event detection and automated remediation.

The processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 4, the processor 410 may more generally include any number of processors configured to perform individually or collectively any number of operations described in the present disclosure. Additionally, one or more of the processors 410 may be present on one or more different electronic devices or computing systems. In some embodiments, the processor 410 may interpret and/or execute program instructions and/or process data stored in the memory 412, the data storage 404, or the memory 412 and the data storage 404. In some embodiments, the processor 410 may fetch program instructions from the data storage 404 and load the program instructions in the memory 412. After the program instructions are loaded into the memory 412, the processor 410 may execute the program instructions.

The memory 412 and the data storage 404 may include computer-readable storage media for carrying or having computer-executable instructions or data structures stored thereon. Such computer-readable storage media may include any available media that may be accessed by a general-purpose or special-purpose computer, such as the processor 410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 414 may include one or more pieces of hardware configured to receive and send communications. In some embodiments, the communication unit 414 may include one or more of an antenna, a wired port, and modulation/demodulation hardware, among other communication hardware devices. In particular, the communication unit 414 may be configured to receive a communication from outside the computer system 400 and to present the communication to the processor 410 or to send a communication from the processor 410 to another device or network (e.g., 122 of FIG. 1).

The user interface device 416 may include one or more pieces of hardware configured to receive input from and/or provide output to a user. In some embodiments, the user interface device 416 may include one or more of a speaker, a microphone, a display, a keyboard, a touch screen, or a holographic projection, among other hardware devices.

The module 418 may include program instructions stored in the data storage 404. The processor 410 may be configured to load the module 418 into the memory 412 and execute the module 418. Alternatively, the processor 410 may execute the module 418 line-by-line from the data storage 404 without loading them into the memory 412. When executing the module 418, the processor 410 may be configured to perform one or more processes or operations described elsewhere in this disclosure.

Modifications, additions, or omissions may be made to the computer system 400 without departing from the scope of the present disclosure. For example, in some embodiments, the computer system 400 may not include the user interface device 416. In some embodiments, the different components of the computer system 400 may be physically separate and may be communicatively coupled via any suitable mechanism. For example, the data storage 404 may be part of a storage device that is separate from a device, which includes the processor 410, the memory 412, and the communication unit 414, that is communicatively coupled to the storage device. The embodiments described herein may include the use of a special-purpose or general-purpose computer including various computer hardware or software modules, as discussed in greater detail below.

Figure 5:
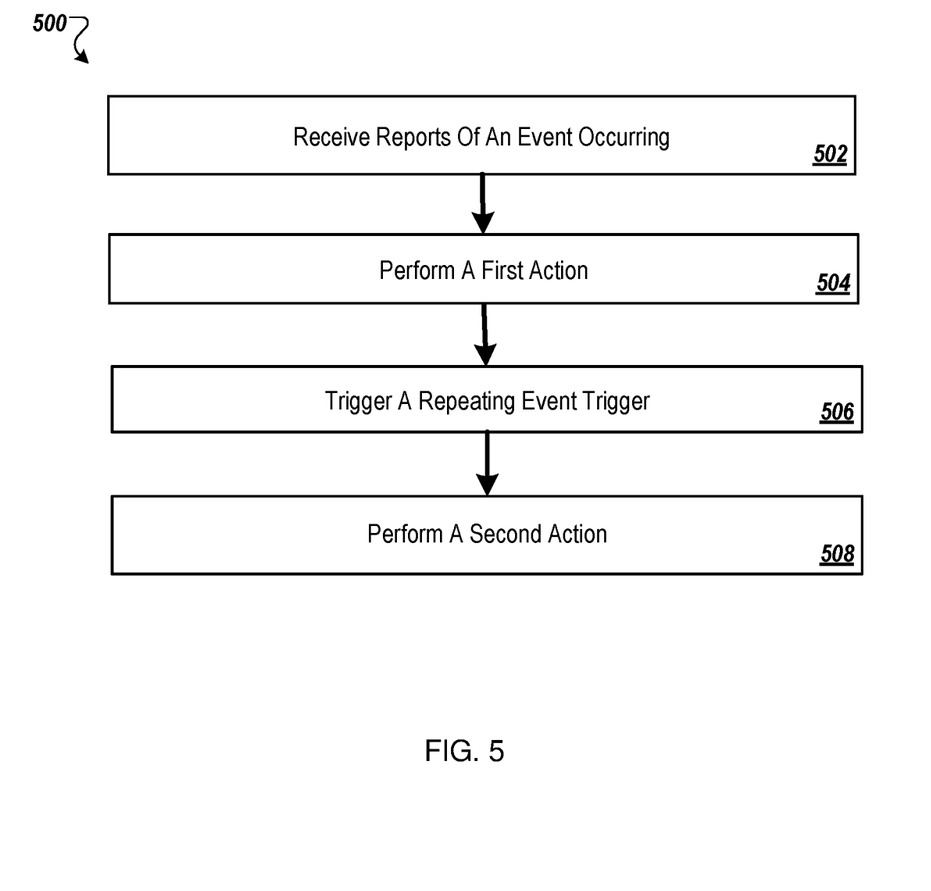
FIG. 5 is a flowchart of an example method of network event detection and automated remediation implemented to facilitate network security, all according to at least one embodiment described in the present disclosure

FIG. 5 is a flowchart of an example method 500 of network event detection and automated remediation implemented to facilitate network security according to at least one embodiment of the present disclosure. The network in which the method 500 is performed may correspond to the managed network described with reference to FIGS. 1-3 or in another suitable environment. The method 500 may be performed by the endpoint management system 102, the endpoint device 108, the computer system 400, described above, or any other suitable computing system.

In some embodiments, a computing system implementing the method 500 may include or may be communicatively coupled to a non-transitory computer-readable medium (e.g., the memory 412 of FIG. 4) having stored thereon programming code or instructions that are executable by one or more processors (such as the processor 410 of FIG. 4) to cause a computing system to perform or control performance of the method 500. Additionally or alternatively, the computer system may include the processor 410 that is configured to execute computer instructions to cause the computer system to perform or control performance of the method 500. The computer system implementing the method 500 may be included in a cloud-based managed network, an on-premises system, or another suitable network computing environment. Although illustrated as discrete blocks, one or more blocks FIG. 5 may be divided into additional blocks, combined into fewer blocks, or eliminated, depending on the desired implementation.

The method 500 may begin at block 502 by receiving reports of an event occurring to at least one endpoint device of a plurality of endpoint devices. The plurality of endpoint devices may generally correspond to the compliant endpoint devices I 08 of FIG. 1. The event may generally correspond to the event definition 202 of FIG. 2.

The method 500 may continue at block 504 by performing a first action in response to receiving a first report of the event occurring. Performance of the first action may be based at least in part on a repeating event trigger not being triggered. The first action and the repeating event trigger may generally correspond, respectively, to the actions 206 and the repeating event trigger 203 of FIG. 2.

The method 500 may continue at block 506 by triggering the repeating event trigger based at least in part on receiving a threshold number of reports of the event occurring. In some embodiments, the repeating event trigger may be associated with reports of the event occurring a plurality of times to a first endpoint device of the plurality of endpoint devices. Alternately or additionally, the repeating event trigger may be associated with reports of the event occurring to a threshold number of endpoint devices of the plurality of endpoint devices. Alternately or additionally, triggering the repeating event trigger may be further based at least in part on receiving the threshold number of reports of the event occurring within a threshold length of time. In some embodiments, the repeating event trigger may remain triggered for a period-reset length of time.

The method 500 may continue at block 508 by performing a second action in response to receiving a second report of the event occurring. Performance of the second action may be based at least in part on the repeating event trigger being triggered. The second action may be different from the first action. The second action may generally correspond to the actions 206 of FIG. 2. In some embodiments, the second action may include isolating an endpoint device from the network.

For this and other processes and methods disclosed herein, the functions performed in the processes and methods may be implemented in differing order. Furthermore, the outlined operations are provided only as examples, and some of the operations may be optional, combined into fewer operations, or expanded into additional operations without detracting from the essence of the embodiments.

In some embodiments, the first action and/or the second action may include sending a message to a user of a first endpoint device of the plurality of endpoint devices. Optionally, a fourth action, which may be based on a received response to the message, may be performed.

Alternately or additionally, in some embodiments, the method 500 may continue by performing a third action in response to receiving the second report of the event occurring. Performance of the third action may be based at least in part on the repeating event trigger being triggered. The third action may be configured to be performed no more than one time following the triggering of the repeating event trigger. In some embodiments, the third action includes sending an alert to a user associated with management of the network.

The embodiments described herein may include the endpoint management system 102 and/or the endpoint devices 108 of FIG. 1 having various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the embodiments and the concepts contributed to furthering the art and are to be construed as being without limitation to such specifically recited examples and conditions. Although embodiments have been described in detail, various changes, substitutions, and alterations could be made hereto without departing from the scope of the embodiments.

What is claimed is:

1. A method of identification and automated remediation of a mass event in a managed network, the method comprising:
   receiving, at an endpoint management system, a first report of an event occurring at a first endpoint of a plurality of endpoints that are included in a managed network;
   in response to receiving the first report, performing a first automated resolution action at the first endpoint, the first automated resolution action being initiated based at least in part on a repeating event trigger not being triggered;
   receiving, at the endpoint management system, a second report of the event occurring at a second endpoint of the plurality of endpoints;
   in response to receiving the second report:
      determining whether a threshold that triggers the repeating event trigger has been exceeded, wherein the threshold is indicative of a mass event occurrence in the managed network;
      responsive to the threshold being exceeded:
         triggering the repeating event trigger; and
         performing a second automated resolution action in the managed network, the second automated resolution action being different from the first action; and
      responsive to the threshold not being exceeded performing the first automated resolution action at the second endpoint.

2. The method of claim 1, wherein:
   the first report is received at a first time;
   the second report is received at a second time after the first time; and
   the threshold is based on a number of reports being received within a time period between the first time and the second time.

3. The method of claim 2, wherein:
   once the repeating event trigger is triggered, the repeating event trigger may remain triggered for a period-reset length of time; and
   after the period-reset length of time:
      the repeating event trigger is reset; and
      the associated threshold is restarted.

4. The method of claim 1, wherein the threshold includes a particular number of endpoints from which a report is received.

5. The method of claim 1, further comprising after the second automated resolution action is performed:
   receiving a third report of the event occurring at a third endpoint of the plurality of endpoints;
   in response to receiving the third report:
      determining whether an embedded threshold that triggers an embedded repeating event trigger has been exceeded, wherein the embedded threshold is indicative of the wide instance of the event occurrence in the managed network and ineffective remediation by the second automated resolution action;
      responsive to the embedded threshold being exceeded:
         triggering the embedded repeating event trigger; and
         performing a third automated resolution action in the managed network, the third automated resolution action being different from the first and the second automated resolution actions.

6. The method of claim 1, wherein the second automated resolution action includes:
   communication of conditional inquiry to a user of the second endpoint;
   receiving, from the second endpoint, a response to the conditional inquiry; and
   based on the response, performing a first conditional action or a second conditional action.

7. The method of claim 1, wherein:
   the second report indicates a technical issue with a software implemented on the second endpoint or a technical issue with a particular setting on the second endpoint; and
   the second automated resolution action includes application of a remote fix to the technical issue at the second endpoint as well as application of the remote fix at one or more additional endpoints of the plurality of endpoints that include the same software as the second endpoint or the same particular setting as the second endpoint.

8. The method of claim 1, wherein the first and the second reports include automated ticket communicated by an agent loaded to the first and the second endpoints to a service management system of the managed network.

9. The method of claim 1, wherein the second automated resolution action is performed indefinitely while the repeating event trigger is triggered.

10. The method of claim 1, wherein the mass event includes one or more or a combination of:
    a patch that is not installing correctly,
    a security vulnerability that is being exploited,
    an inability to integrate programs,
    an inoperable program,
    a device or network appliance failure, and
    inaccessibility of a database.

11. A computer readable medium configured to cause a system to perform operations of identification and automated remediation of a mass event in a managed network, the operations comprising:
    receiving, at an endpoint management system, a first report of an event occurring at a first endpoint of a plurality of endpoints that are included in a managed network;
    in response to receiving the first report, performing a first automated resolution action at the first endpoint, the first automated resolution action being initiated based at least in part on a repeating event trigger not being triggered;
    receiving, at the endpoint management system, a second report of the event occurring at a second endpoint of the plurality of endpoints;
    in response to receiving the second report:
       determining whether a threshold that triggers the repeating event trigger has been exceeded, wherein the threshold is indicative of a mass event occurrence in the managed network;
       responsive to the threshold being exceeded:
          triggering the repeating event trigger; and
          performing a second automated resolution action in the managed network, the second automated resolution action being different from the first action; and
       responsive to the threshold not being exceeded performing the first automated resolution action at the second endpoint.

12. The computer readable medium of claim 11, wherein:
the first report is received at a first time;
the second report is received at a second time after the first time; and
the threshold is based on a number of reports being received within a time period between the first time and the second time.

13. The computer readable medium of claim 12, wherein:
once the repeating event trigger is triggered, the repeating event trigger may remain triggered for a period-reset length of time; and
after the period-reset length of time:
the repeating event trigger is reset; and
the associated threshold is restarted.

14. The computer readable medium of claim 11, wherein the threshold includes a particular number of endpoints from which a report is received.

15. The computer readable medium of claim 11, wherein the operations further comprise:
further comprising after the second automated resolution action is performed:
receiving a third report of the event occurring at a third endpoint of the plurality of endpoints;
in response to receiving the third report:
determining whether an embedded threshold that triggers an embedded repeating event trigger has been exceeded, wherein the embedded threshold is indicative of the wide instance of the event occurrence in the managed network and ineffective remediation by the second automated resolution action;
responsive to the embedded threshold being exceeded:
triggering the embedded repeating event trigger; and
performing a third automated resolution action in the managed network, the third automated resolution action being different from the first and the second automated resolution actions.

16. The computer readable medium of claim 15, wherein the second automated resolution action includes:
communication of conditional inquiry to a user of the second endpoint;
receiving, from the second endpoint, a response to the conditional inquiry; and
based on the response, performing a first conditional action or a second conditional action.

17. The computer readable medium of claim 11, wherein:
the second report indicates a technical issue with a software implemented on the second endpoint or a technical issue with a particular setting on the second endpoint; and
the second automated resolution action includes application of a remote fix to the technical issue at the second endpoint as well as application of the remote fix at one or more additional endpoints of the plurality of endpoints that include the same software as the second endpoint or the same particular setting as the second endpoint.

18. The computer readable medium of claim 17, wherein the first and the second reports include automated ticket communicated by an agent loaded to the first and the second endpoints to a service management system of the managed network.

19. The computer readable medium of claim 11, wherein the second automated resolution action is performed indefinitely while the repeating event trigger is triggered.

20. The computer readable medium of claim 11, wherein the mass event includes one or more or a combination of:
a patch that is not installing correctly,
a security vulnerability that is being exploited,
an inability to integrate programs,
an inoperable program,
a device or network appliance failure, and
inaccessibility of a database.

* * * * *